(12) United States Patent
Miyagi et al.

(10) Patent No.: US 8,225,338 B2
(45) Date of Patent: Jul. 17, 2012

(54) ELECTRONIC APPARATUS

(75) Inventors: Junji Miyagi, Daito (JP); Takayuki Yamamoto, Daito (JP); Mari Muroi, Daito (JP)

(73) Assignee: Funai Electric Co., Ltd., Osaka (JP)

(*) Notice: Subject to any disclaimer, the term of this patent is extended or adjusted under 35 U.S.C. 154(b) by 0 days.

(21) Appl. No.: 13/081,018

(22) Filed: Apr. 6, 2011

(65) Prior Publication Data
US 2011/0249542 A1  Oct. 13, 2011

(30) Foreign Application Priority Data

Apr. 9, 2010  (JP) ................................ 2010-090945

(51) Int. Cl.
*G11B 17/03* (2006.01)
*H05K 7/00* (2006.01)
(52) U.S. Cl. .................... 720/600; 361/679.01
(58) Field of Classification Search ............ 369/69; 720/600, 672, 689; 386/358, 362; 361/679.01, 361/679.02, 679.21, 679.26, 679.27
See application file for complete search history.

(56) References Cited

U.S. PATENT DOCUMENTS

| | | | | |
|---|---|---|---|---|
| 5,265,083 A | * | 11/1993 | Ishii et al. | 720/600 |
| 2004/0246399 A1 | | 12/2004 | Ahn | |
| 2005/0115025 A1 | * | 6/2005 | Minaguchi et al. | 16/259 |
| 2006/0262496 A1 | * | 11/2006 | Lee | 361/683 |
| 2007/0047183 A1 | * | 3/2007 | Goto et al. | 361/679 |
| 2007/0047192 A1 | * | 3/2007 | Kobayashi et al. | 361/683 |
| 2008/0130213 A1 | * | 6/2008 | Goto et al. | 361/683 |
| 2010/0149744 A1 | * | 6/2010 | Kitamura et al. | 361/679.27 |
| 2010/0182742 A1 | * | 7/2010 | Mihara et al. | 361/679.01 |
| 2011/0156563 A1 | * | 6/2011 | Hamada et al. | 312/326 |

FOREIGN PATENT DOCUMENTS

| | | |
|---|---|---|
| JP | 2002-117664 | 4/2002 |
| JP | 2004-326086 | 11/2004 |
| JP | 2005-165478 | 6/2005 |

* cited by examiner

*Primary Examiner* — Thang Tran
(74) *Attorney, Agent, or Firm* — Morgan, Lewis & Bockius LLP

(57) ABSTRACT

An optical disc reproduction apparatus as electronic apparatus has a display unit mounted via a hinge unit on a main body unit which has a main body case having lower and upper cases for housing a control board and a hinge connecting portion connected to a main body-side joint member of the hinge unit. The hinge connecting portion is formed of a part of the main body case, and has upper and lower connecting members formed of a part of the upper case and a part of the lower case, respectively. The lower connecting member is overlaid on a lower surface of the upper connecting member. The main body-side joint member is attached to the upper connecting member, and connected to both the upper and lower connecting members with hinge mounting screws so as to be connected to the hinge connecting portion.

7 Claims, 5 Drawing Sheets

ELECTRONIC APPARATUS

BACKGROUND OF THE INVENTION

1. Field of the Invention

The present invention relates to an electronic apparatus having a function to display images.

2. Description of the Related Art

In some of conventional electronic apparatus having a function to display images, a display unit for displaying images is mounted on a main body unit via a hinge unit, in which the display unit can pivot relative to the main body unit (for example, refer to Japanese Laid-open Patent Publications 2005-165478 and 2004-326086). Generally, in such electronic apparatus, the main body unit has a main body case housing a control board, in which the main body case is composed of an upper case and a lower case that are connected to each other. For connecting the hinge unit to the main body unit, the hinge unit is connected e.g. by screwing to a hinge connecting portion formed of a portion of the main body case (a portion of the upper case or a portion of the lower case). For example, in Japanese Laid-open Patent Publication 2005-165478 referred to above, the hinge unit is connected e.g. by screwing to a hinge connecting portion formed of a portion of a lower case of a main body case of the main body unit.

In the conventional electronic apparatus, the hinge unit is connected to the hinge connecting portion while the display unit is connected to the electronic apparatus via the hinge unit, so that a high load is applied to the hinge connecting portion. Thus, the hinge connecting portion is required to have a strong structure to withstand a high load. Generally, the hinge unit has a main body-side joint member to be connected to the main body unit (more specifically to the hinge connecting portion of the main body case of the main body unit), in which the main body-side joint member is made small so as to allow the hinge unit to be connected to various kinds of apparatus (or to be used for general purpose applications).

Furthermore, the main body case is generally formed by resin molding, making it difficult to make the main body case thicker than a certain thickness, so that inevitably the hinge connecting portion, which is formed of a portion of the main body case (a portion of the upper case or a portion of the lower case), is formed to have a small thickness. Thus, if the main body-side joint member of the hinge unit is simply connected to the hinge connecting portion of the main body case, there is a risk that a load applied to the hinge connecting porting may be concentrated in a narrow area of the hinge connecting portion, and that the small thickness of the hinge connecting portion may prevent the hinge connecting portion from being able to withstand a high load, causing it to be broken. This problem of the conventional electronic apparatus might be solved if a metal plate having a larger area than the main body-side joint member of the hinge unit is used as a reinforcing member, and this metal plate is placed between the main body-side joint member of the hinge unit and the hinge connecting portion of the main body case. This arrangement makes it possible to disperse the load applied to the hinge connecting portion over its wide area to allow the hinge connecting portion to withstand a high load. However, this arrangement separately requires a metal plate, thereby increasing the cost.

There are various improvements relating to the connection of a hinge or hinge unit to another member in electronic apparatus. For example, in the electronic apparatus of Japanese Laid-open Patent Publication 2004-326086 referred to above, the hinge unit is connected to a case of the display unit for connecting the hinge unit to the display unit. Further, in a portable CD (Compact Disc) reproduction apparatus disclosed in Japanese Laid-open Patent Publication 2002-117664, a portion of a cover on or near which a hinge is connected is formed in two layers: a first layer made of a relatively light material; and a second layer, as a hinge reinforcing member, made of a material superior in strength and processability to the material of the first layer. However, these improvements disclosed in the prior art do not solve the problems described above.

SUMMARY OF THE INVENTION

An object of the present invention is to provide an electronic apparatus which can achieve a strong hinge connection structure at a low cost.

According to the present invention, this object is achieved by an electronic apparatus comprising a main body unit, a hinge unit and a display unit for displaying images which is mounted on the main body unit via the hinge unit. The hinge unit comprises: a display-side joint member connected to the display unit; a main body-side joint member connected to the main body unit; and a hinge mechanical unit to pivotally connect the display-side joint member and the main body-side joint member to each other. The main body unit comprises: a control board; a main body case for housing the control board; and a hinge connecting portion to be connected to the main body-side joint member of the hinge unit. The main body case comprises a lower case corresponding to a lower part of the main body case, and an upper case corresponding to an upper part of the main body case and connected to the lower case. The hinge connecting portion is formed of a part of the main body case, and comprises: an upper connecting member which is formed of a part of the upper case and to which the main body-side joint member of the hinge unit is attached; and a lower connecting member which is formed of a part of the lower case and which is overlaid on the upper connecting member. Further, the main body-side joint member of the hinge unit is connected to both the upper connecting member and the lower connecting member with hinge mounting screws so as to be connected to the hinge connecting portion.

According to the electronic apparatus of the present invention, the hinge connecting portion is connected to the main body-side joint member of the hinge unit in the state where the upper connecting member (a part of the upper case of the main body case) and the lower connecting member (a part of the lower case of the main body case) of the hinge connecting portion are overlaid with each other to integrate the upper connecting member and the lower connecting member (i.e. where the overlaid portions of the upper case and the lower case of the main body case are integrated with each other). The overlay and integration of the upper connecting member and the lower connection member of the hinge connecting portion with each other allows the hinge connecting portion to have a large thickness. Further, the presence of the upper connecting member between the main body-side joint member of the hinge unit and the lower connecting member allows a load applied to the lower connecting member to be dispersed over a wide area of the lower connecting member. These make it possible for the hinge connecting portion to withstand a high load, thereby achieving a strong hinge connection structure. In addition, this structure does not require a separate reinforcing member such as a metal plate, so that the strong hinge connection structure can be achieved at a low cost.

Preferably, the main body unit further comprises a hinge housing portion formed therein for housing the main body-side joint member of the hinge unit. The hinge housing portion is recessed inside its periphery in the main body case, and is open facing outward from the main body case so as to allow the main body-side joint member of the hinge unit to be housed into the hinge housing portion from outside the main body case. Further, the hinge connecting portion is placed in the hinge housing portion. Furthermore, the main body-side joint member of the hinge unit, while housed in the hinge housing portion, is connected to the hinge connecting portion. The electronic apparatus according to this preferred mode makes it possible to house the main body-side joint member of the hinge unit into the hinge housing portion from outside the main body case, and to connect the main body-side joint member to the hinge connecting portion, in a state where the upper case and the lower case of the main body case are connected to each other. Thus, when assembling the electronic apparatus, the hinge unit can be connected to the main body case in the state where the upper case and the lower case of the main body case are connected to each other, i.e. where the control board is housed in the main body case, making it possible to achieve high assembling efficiency. In addition, in the electronic apparatus, the main body-side joint member of the hinge unit is housed in the hinge housing portion, which is recessed inside its periphery in the main body case, so that the electronic apparatus can be kept thin.

Further preferably, the electronic apparatus further comprises an electrical wiring for electrically connecting the display unit to the main body unit. The upper connecting member comprises: a bottom base positioned above the lower connecting member; and post portions projecting from the bottom base for supporting the main body-side joint member of the hinge unit. Further, the electrical wiring extends inside the hinge unit and between the bottom base and front ends of the post portions, and is connected to the control board. The electronic apparatus according to this preferred mode makes it possible to provide a space to allow the electrical wiring to extend therethrough, and at the same time makes it possible to achieve a strong hinge connection structure.

Still further preferably, the main body unit further comprises an optical disc reading unit for reading recorded data from an optical disc. The main body case houses the control board and the optical disc reading unit therein. Further, the display unit displays images based on recorded data read by the optical disc reading unit from the optical disc. The electronic apparatus according to this preferred mode makes it possible to achieve the same effects as those of the present invention described above in the case where the electronic apparatus serves to display images based on recorded data read from an optical disc.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1A:
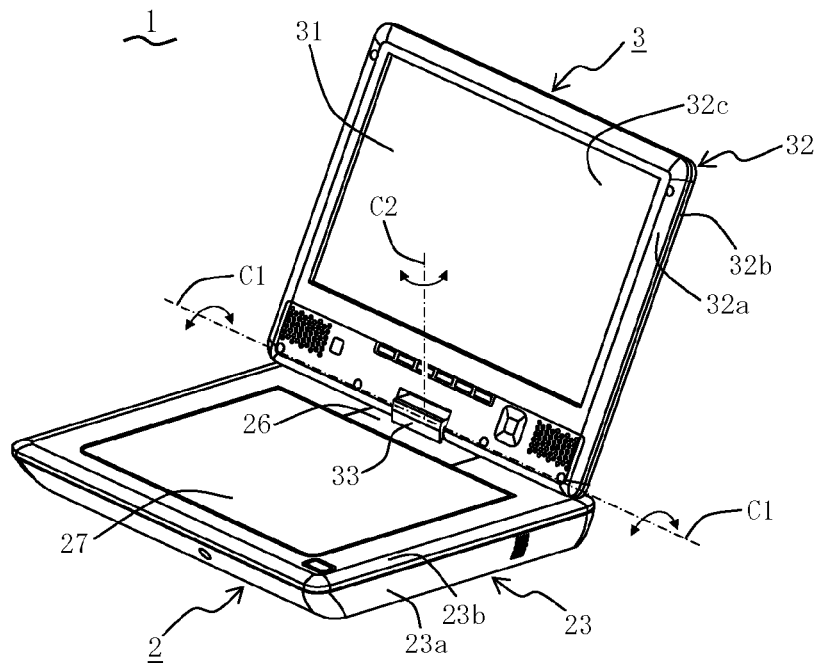
FIG. 1A is a schematic perspective view of an optical disc reproduction apparatus according to an embodiment of the present invention in which an inner cover is closed while a display unit is opened to stand.

Embodiments of the present invention, as best mode for carrying out the invention, will be described hereinafter with reference to the drawings. The present invention relates to an electronic apparatus. It is to be understood that the embodiments herein are not intended as limiting, or encompassing the entire scope of, the invention. It is also to be noted that like parts are designated by like reference numerals or characters throughout the drawings.

Figure 1B:
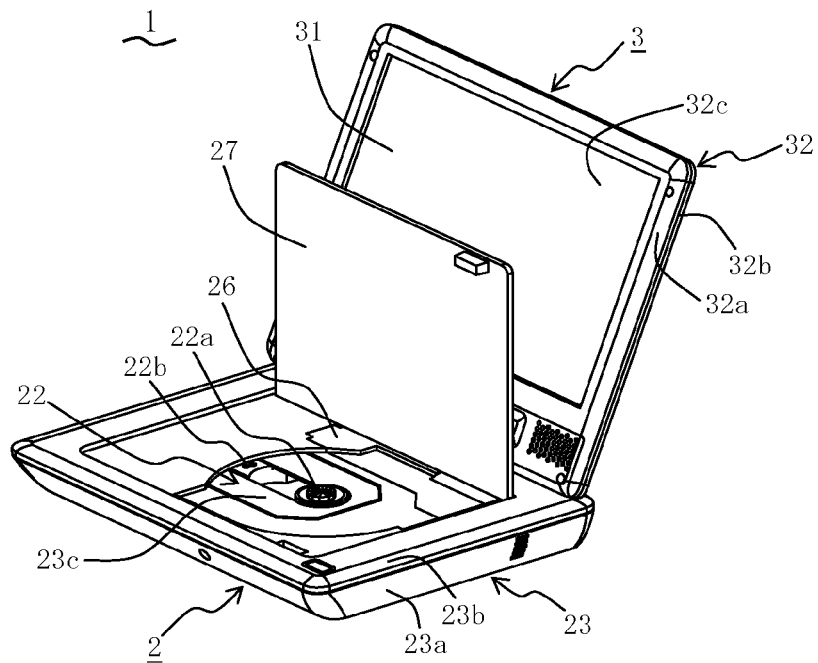
FIG. 1B is a schematic perspective view of the optical disc reproduction apparatus in which the inner cover is opened while the display unit is opened to stand.
Figure 2A:
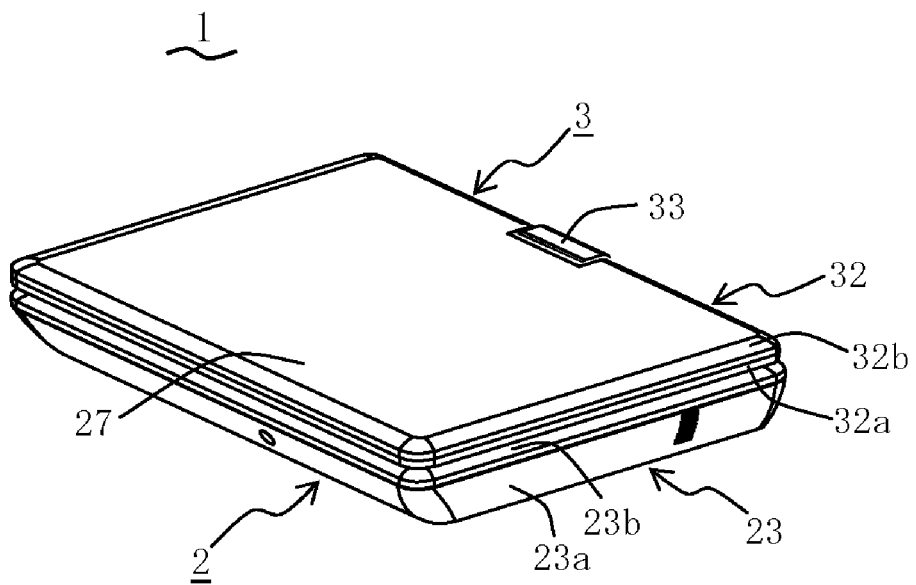
FIG. 2A is a schematic perspective view of the optical disc reproduction apparatus in which the display unit is closed.
Figure 2B:
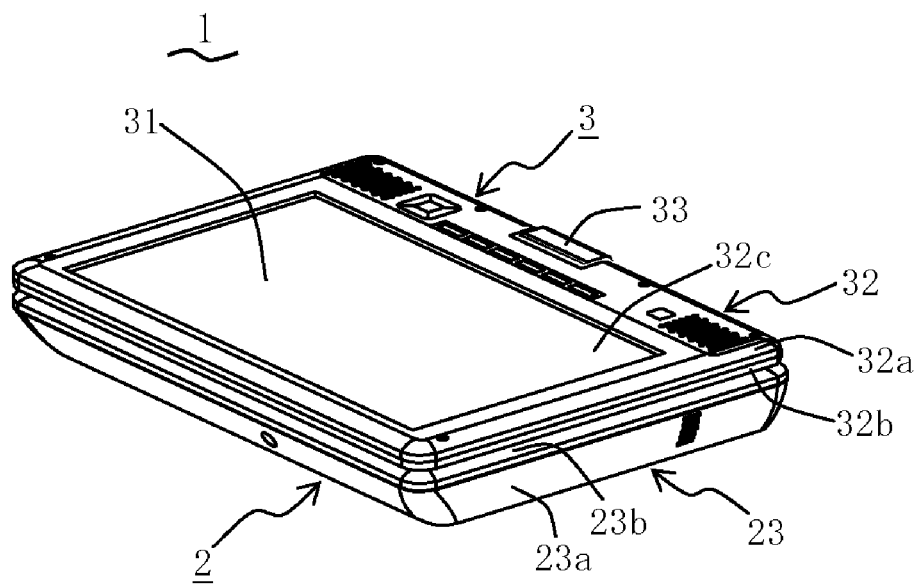
FIG. 2B is a schematic perspective view of the optical disc reproduction apparatus in which the inner cover is closed while the display unit is laid on a main body unit and opened.
Figure 3:
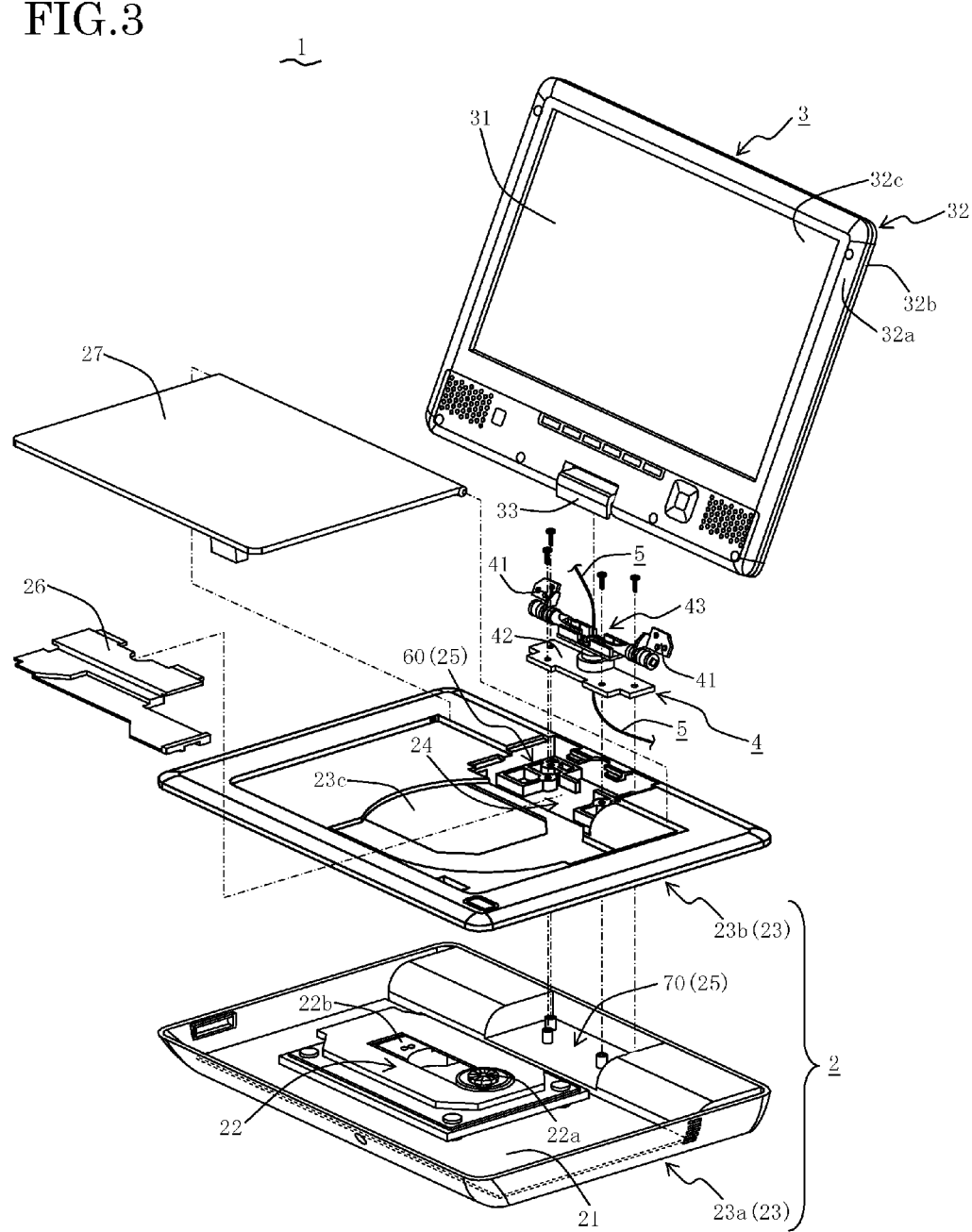
FIG. 3 is a schematic exploded perspective view of the optical disc reproduction apparatus.

An optical disc reproduction apparatus 1 as an electronic apparatus according to an embodiment of the present invention will be described with reference to FIGS. 1A, 1B, FIGS. 2A, 2B, FIG. 3, FIG. 4 and FIG. 5. FIG. 1A is a schematic perspective view of the optical disc reproduction apparatus 1 in which an inner cover 27 is closed while a display unit 3 is opened to stand, and FIG. 1B is a schematic perspective view of the optical disc reproduction apparatus 1 in which the inner cover 27 is opened while the display unit 3 is opened to stand. FIG. 2A is a schematic perspective view of the optical disc reproduction apparatus 1 in which the display unit 3 is laid on a main body unit 2 and closed, and FIG. 2B is a schematic perspective view of the optical disc reproduction apparatus 1 in which the inner cover 27 is closed while the display unit 3 is laid on the main body unit 2 and opened. FIG. 3 is a schematic exploded perspective view of the optical disc reproduction apparatus 1. The optical disc reproduction apparatus 1 serves to reproduce images from an optical disc such as DVD (Digital Versatile Disc) and BD (Blu-ray Disc). The optical disc reproduction apparatus 1 is a portable type.

Referring to FIGS. 1 to 3, the optical disc reproduction apparatus 1 of the present embodiment comprises a main body unit 2, a display unit 3, and a hinge unit 4 via which the display unit 3 is mounted on the main body unit 2. The display unit 3 is pivotal relative to the main body unit 2. The optical disc reproduction apparatus 1 further comprises an electrical wiring 5 for electrically connecting the display unit 3 to the main body unit 2. The electrical wiring 5 extends inside the hinge unit 4. One end of the electrical wiring 5 is connected to the display unit 3, while the other end of the electrical wiring 5 is connected to the main body unit 2. The hinge unit 4 comprises: a display-side joint member 41 connected to the display unit 3; a main body-side joint member 42 connected to the main body unit 2; a hinge mechanical unit 43 to pivotally connect the display-side joint member 41 and the main body-side joint member 42 to each other; and so on. The hinge unit 4 is a so-called two-axis swivel hinge, in which the hinge mechanical unit 43 connects and allows the display-side joint member 41 and the main body-side joint member 42 to be pivotal relative to each other about two mutually perpendicular axes.

The display-side joint member 41 is connected to a center part of a lower end of the display unit 3, while the main body-side joint member 42 is connected to a center part of a rear end of the main body unit 2. This allows the display unit 3 to be pivotal relative to the main body unit 2 about the two mutually perpendicular axes. More specifically, the display unit 3 is pivotal relative to the main body unit 2 about an axis, serving as a first center pivot axis (axis C1 in FIG. 1A), passing through a lower end portion of the display unit 3 and parallel to a lower end periphery of the display unit 3. Further, the display unit 3 is also pivotal relative to the main body unit 2 about an axis, serving as a second center pivot axis (axis C2 in FIG. 1A), passing through the center part of the rear end of the main body unit 2 and vertical to an upper surface of the main body unit 2.

Since the display unit 3 is thus pivotal relative to the main body unit 2 about the two mutually perpendicular axes, the optical disc reproduction apparatus 1 can be brought to various states including: a state where the display unit 3 is closed as in FIG. 2A (more specifically the display unit 3 is laid on the main body unit 2 such that a front surface of the display unit 3 closely faces the upper surface of the main body unit 2); a state where the display unit 3 is opened to stand as in FIGS. 1A and 1B (more specifically the display unit 3 stands relative to the main body unit 2); and a state where the display unit 3 is laid on the main body unit 2 and opened as in FIG. 2B (more specifically the display unit 3 is laid on the main body unit 2 such that a rear surface of the display unit 3 closely faces the upper surface of the main body unit 2).

When using the optical disc reproduction apparatus 1, it is brought to a state where, for example, the display unit 3 is opened to stand, or the display unit 3 is laid on the main body unit 2 and opened. When carrying the optical disc reproduction apparatus 1 as a portable apparatus, the display unit 3 is closed, for example. The optical disc reproduction apparatus 1 is designed to be connectable to an external device (not shown) for use (so that, for example, recorded data on an optical disc which is read from the optical disc by the optical disc reproduction apparatus 1 can be displayed on a display of the external device). When connecting the optical disc reproduction apparatus 1 to an external device for use, it is brought, for example, to a state where the display unit 3 is closed.

The main body unit 2 comprises: a control board 21 for controlling the operation of the optical disc reproduction apparatus 1; an optical disc reading unit 22 for reading recorded data from an optical disc; a main body case 23 for housing the control board 21 and the optical disc reading unit 22; and so on. The main body unit 2 further comprises a hinge housing portion 24 formed therein, and also comprises a hinge connecting portion 25, a housing portion cover 26, an inner cover 27 and so on as will be described later. The optical disc reading unit 22 comprises a spindle motor 22a coupled to the optical disc for rotating the optical disc, and an optical pickup head 22b for reading data recorded on the optical disc.

The main body case 23 comprises a lower case 23a corresponding to (or more specifically, occupying) a lower part of the main body case 23, and an upper case 23b corresponding to (or more specifically, occupying) an upper part of the main body case 23, in which the lower case 23a and the upper case 23b are connected to each other. The lower case 23a and the upper case 23b are made of resin. The control board 21 is arranged parallel to a lower surface (bottom surface) of the main body case 23. The optical disc reading unit 22 is arranged above the control board 21. A part of the optical disc reading unit 22 including the spindle motor 22a and the optical pickup head 22b is arranged to face a reading opening 23c formed in the upper case 23b, while the optical disc is arranged to be mounted above the reading opening 23c.

The hinge housing portion 24 serves to house the main body-side joint member 42 of the hinge unit 4. The hinge housing portion 24 is recessed inside its periphery in the main body case 23, and is open facing outward from the main body case 23 so as to allow the main body-side joint member 42 of the hinge unit 4 to be housed into the hinge housing portion 24 from outside the main body case 23. In the present embodiment, the hinge housing portion 24 is recessed downward (toward the lower case 23a) from its periphery in the upper case 23b of the main body case 23, and is open facing upward from the main body case 23. Further, the hinge housing portion 24 is connected to a space in which the control board 21 is housed, so as to make it possible to connect the electrical wiring 5 to the control board 21 from the hinge housing portion 24 without extending the electrical wiring 5 outside the main body case 23.

The hinge connecting portion 25 is connected to the main body-side joint member 42 of the hinge unit 4, and is provided on a bottom portion of, and placed in, the hinge housing portion 24. The hinge connecting portion 25 is formed of a part of the main body case 23, and comprises an upper connecting member 60 formed of a part of the upper case 23b and a lower connecting member 70 formed of a part of the lower case 23a. The main body-side joint member 42 of the hinge unit 4, while housed in the hinge housing portion 24, is connected to the hinge connecting portion 25 by screwing. Details of the structure of the hinge connecting portion 25 of the main body unit 2 as well as the structure of connecting the main body-side joint member 42 of the hinge unit 4 to the hinge connecting portion 25 will be described later. The housing portion cover 26 serves to cover the opening of the hinge housing portion 24, and is attached to the upper case 23b of the main body case 23 to cover the housing portion 24. The inner cover 27 is pivotally attached to the upper case 23b of the main body case 23 so as to open/close an optical disc mounting area.

The display unit 3 serves to display images, and comprises a liquid crystal panel 31 for displaying images, a display case 32 for housing the liquid crystal panel 31, a hinge cover 33, and so on. The display case 32 comprises a front case 32a corresponding to (more specifically, occupying) a front part of the display case 32, and a rear case 32b corresponding to (more specifically, occupying) a rear part of the display case 32, in which the front case 32a and the rear case 32b are connected to each other. The liquid crystal panel 31 faces a display opening 32c formed in the front case 32a. The hinge cover 33 serves to cover the hinge mechanical unit 43 of the hinge unit 4 (which is exposed from both the main body unit 2 and the display unit 3), and is attached to the display case 32.

The display unit 3 displays images based on recorded data read from the optical disc by the optical disc reading unit 22 of the main body unit 2. The display-side joint member 41 of the hinge unit 4 is connected by screwing to a hinge mounting portion (not shown) provided on an inner surface of the rear case 32b of the display case 32. The electrical wiring 5 extends inside the hinge unit 4. One end of the electrical wiring 5 on the side of the display unit 3 extends from above the hinge mechanical unit 43, and is connected to a circuit board (not shown) in the display unit 3, while the other end of the electrical wiring 5 on the side of the main body unit 2 extends from below the main body-side joint member 42 of the hinge unit 4, and is connected to the control board 21.

Figure 4:
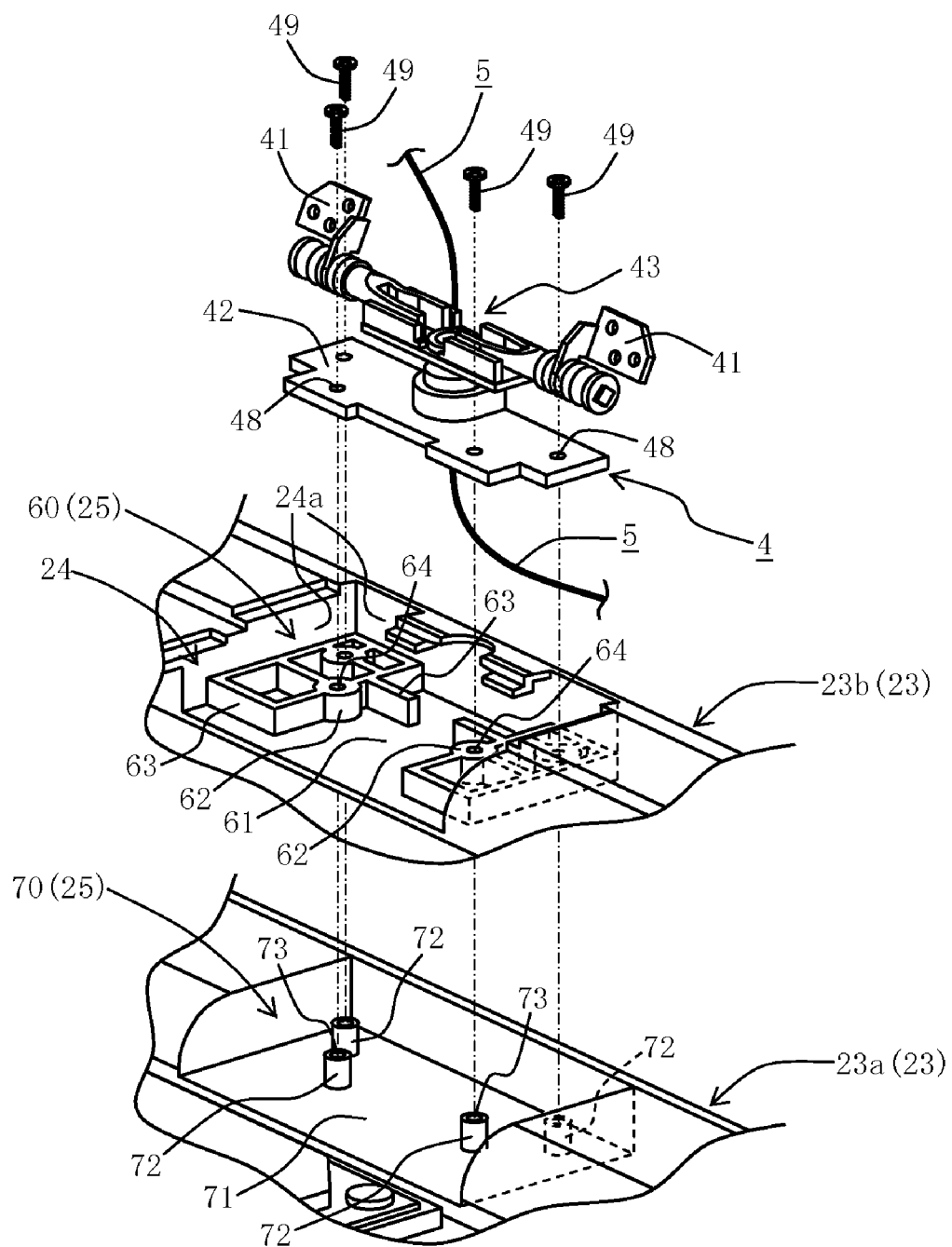
FIG. 4 is an enlarged schematic exploded perspective view of a part of FIG. 3 showing the structure of a hinge connecting portion of the optical disc reproduction apparatus.
Figure 5:
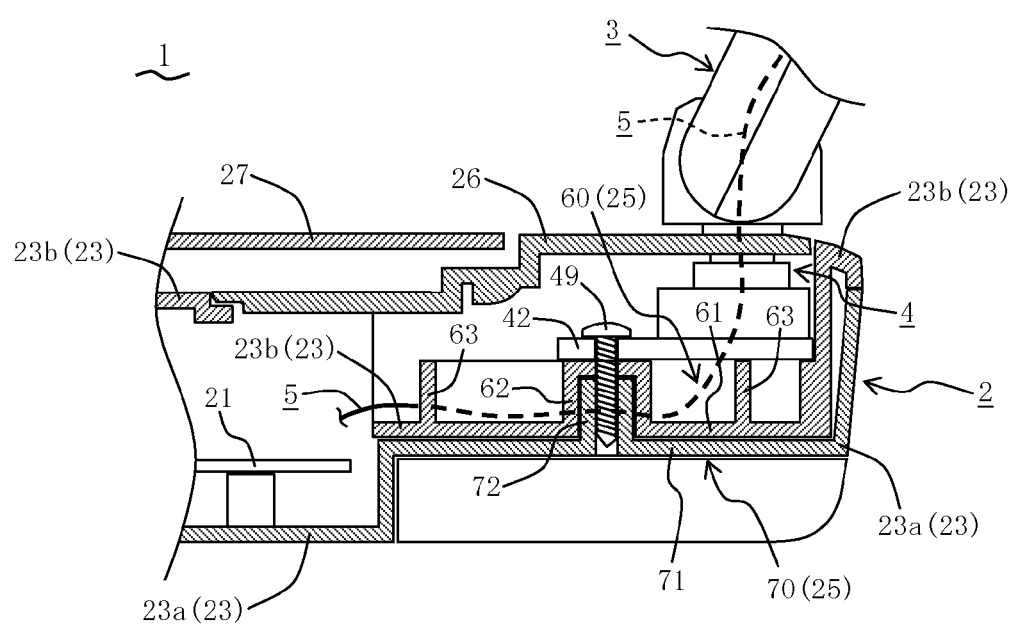
FIG. 5 is a schematic cross-sectional view of a part of the optical disc reproduction apparatus.

FIG. 4 is an enlarged schematic exploded perspective view of a part of FIG. 3 showing the structure of the hinge connecting portion 25 of the optical disc reproduction apparatus 1, while FIG. 5 is a schematic cross-sectional view of a part of the optical disc reproduction apparatus 1. FIG. 4 and FIG. 5 show the structure of the hinge connecting portion 25 of the main body unit 2 as well as the structure of connecting the main body-side joint member 42 of the hinge unit 4 to the hinge connecting portion 25. As described above, the hinge connecting portion 25 is formed of a part of the main body case 23, and comprises the upper connecting member 60 formed of a part of the upper case 23b and the lower connecting member 70 formed of a part of the lower case 23a. Referring to FIGS. 4 and 5, the main body-side joint member 42 of the hinge unit 4 is attached to the upper connecting member 60, while the lower connecting member 70 is overlaid on the upper connecting member 60, or more specifically on a lower surface of the upper connecting member 60.

The upper connecting member 60 comprises: a bottom base 61 positioned above the lower connecting member 70; four post portions 62 projecting from the bottom base 61 for supporting the main body-side joint member 42 of the hinge unit 4; and reinforcing ribs 63 for reinforcing the bottom base 61 and the post portions 62. Each of the post portions 62 has a cylindrical shape, and has a screw hole 64 formed in a front end (upper end) thereof. Further, each post portion 62 has a hollow inside, which is open at a lower surface of the bottom base 61. The screw hole 64 of each post portion 62 is connected to the inside hollow of the each post portion 62. The reinforcing ribs 63 are formed to be connected to the bottom base 61 and to the post portions 62 and side walls 24a of the hinge housing portion 24. The reinforcing ribs 63 have an upper end at the same level as the front end of the post portions 62 from the bottom base 61. The bottom base 61, the post portions 62 and the reinforcing ribs 63 (i.e. the upper connecting member 60) are formed of resin integrally with the upper case 23b so as to be formed of a part of the upper case 23b.

The lower connecting member 70 comprises: an overlay base 71 overlaid on the lower surface of the bottom base 61 of the upper connecting member 60; and four projections 72 projecting from the overlay base 71 and inserted into the inside hollows of the post portions 62 of the upper connecting member 60. Each of the projections 72 has a cylindrical shape, and has a screw hole 73 formed in a front end (upper end) thereof. The overlay base 71 and the projections 72 (i.e. the lower connecting member 70) are formed of resin integrally with the lower case 23a so as to be formed of a part of the lower case 23a. When the lower case 23a and the upper case 23b of the main body case 23 are connected to each other, the overlay base 71 of the lower connecting member 70 is brought to a state where the overlay base 71 is overlaid on the lower surface of the bottom base 61 of the upper connecting member 60, either intimately or with a small gap between the overlay base 71 and the lower surface of the bottom base 61. In this state, each projection 72 is inserted into the inside hollow of each corresponding post portion 62, either intimately or with a small gap between the projection 72 and an inner wall of the inside hollow of the post portion 62. Thus, the screw hole 73 of each projection 72 of the lower connecting member 70 is connected to the screw hole 64 of each corresponding post portion 62 of the upper connecting member 60.

The main body-side joint member 42 of the hinge unit 4 is attached to the front ends of the post portions 62 of the upper connecting member 60, in which hinge mounting screws 49 are screwed from the main body-side joint member 42 of the hinge unit 4 through screw holes 48 of the main body-side joint member 42 into the screw holes 64 of the post portions 62 of the upper connecting member 60 and the screw holes 73 of the projections 72 of the lower connecting member 70. Thus, according to the present embodiment, the main body-side joint member 42 of the hinge unit 4 is connected to both the upper connecting member 60 and the lower connecting member 70 with the hinge mounting screws 49 so as to be connected to the hinge connecting portion 25.

In a state where the main body-side joint member 42 of the hinge unit 4 is connected to the hinge connecting portion 25 in this way, a space is formed between the bottom base 61 and the front ends of the post portions 62 of the upper connecting member 60 (i.e. between the bottom base 61 of the upper connecting member 60 and the main body-side joint member 42 of the hinge unit 4). This space is used to allow the electrical wiring 5 to extend therethrough. In other words, the post portions 62 of the upper connecting member 60 (as well as the reinforcing ribs 63 and the projections 72 of the lower connecting member 60) are used to provide a space to allow the electrical wiring 5 to extend therethrough.

As described above, the electrical wiring 5 extends inside the hinge unit 4, in which one end of the electrical wiring 5 on the side of the main body unit 2 extends from below the main body-side joint member 42 of the hinge unit 4, and is connected to the control board 21. The electrical wiring 5 which extends from below the main body-side joint member 42 is connected to the control board 21 through the space formed between the bottom base 61 and the front ends of the post portions 62 of the upper connecting member 60. In other words, the electrical wiring 5 extends inside the hinge unit 4 and between the bottom base 61 and the front ends of the post portions 62 of the upper connecting member 60, and is connected to the control board 21.

Next, a method of assembling the optical disc reproduction apparatus 1 of the present embodiment will be described. First, the display unit 3 is connected and assembled with the hinge unit 4. More specifically, while the front case 32a and the rear case 32b of the display case 32 are separate from each other, the electrical wiring 5 is allowed to extend inside the hinge unit 4, and one end of the electrical wiring 5 (on the side where the electrical wiring 5 extends from above the hinge mechanical unit 43 of the hinge unit 4) is connected to the circuit board (not shown) of the display unit 3. Subsequently, the display-side joint member 41 of the hinge unit 4 is connected to the hinge mounting portion (not shown) provided on the inner surface of the rear case 32b. Further, the front case 32a and the rear case 32b are connected to each other to sandwich the liquid crystal panel 31 and the circuit board therebetween so as to house the liquid crystal panel 31 and the circuit board in the display case 32.

On the other hand, the upper case 23b and the lower case 23a of the main body case 23 are connected to each other to sandwich the control board 21 and the optical disc reading unit 22 therebetween so as to house the control board 21 and the optical disc reading unit 22 in the main body case 23. When the upper case 23b and the lower case 23a of the main body case 23 are thus connected, the connections in the hinge connecting portion 25 are made. More specifically, in the hinge connecting portion 25, the overlay base 71 of the lower connecting member 70 is overlaid on the lower surface of the bottom base 61 of the upper connecting member 60, and each projection 72 of the lower connecting member 70 is inserted into the inside hollow of each corresponding post portion 62 of the upper connecting member 60, thus allowing the screw hole 73 of each projection 72 of the lower connecting member 70 to be connected to the screw hole 64 of each corresponding post portion 62 of the upper connecting member 60.

Thereafter, the main body-side joint member 42 of the hinge unit 4 connected to the display unit 3 is connected to the hinge connecting portion 25. More specifically, the main body-side joint member 42 of the hinge unit 4 is housed into the hinge housing portion 24 from outside the main body case 23, and is mounted on the front ends (upper ends) of the post portions 62 of the upper connecting member 60 of the hinge connecting portion 25. Subsequently, the hinge mounting screws 49 are screwed from the main body-side joint member 42 of the hinge unit 4 through the screw holes 48 of the main body-side joint member 42 into the screw holes 64 of the post portions 62 of the upper connecting member 60 and the screw holes 73 of the projections 72 of the lower connecting member 70. Thus, the main body-side joint member 42 of the hinge unit 4, while housed in the hinge housing portion 24, is connected to both the upper connecting member 60 and the lower connecting member 70 with the hinge mounting screws 49 so as to be connected to the hinge connecting portion 25.

Further, the electrical wiring 5 is allowed to extend through the space formed between the bottom base 61 and the front ends of the post portions 62 of the upper connecting member 60, and is connected at the other end thereof (on the side where the electrical wiring 5 extends from below the main body-side joint member 42 of the hinge unit 4) to the control board 21 from the hinge housing portion 24. Thus, the electrical wiring 5 extends inside the hinge unit 4 and between the bottom base 61 and the front ends of the post portions 62 of the upper connecting member 60, and is connected to the control board 21 without extending outside the main body case 23. Subsequently, the housing portion cover 26 is attached to the upper case 23b of the main body case 23. Thus, the housing portion cover 26 covers the opening of the hinge housing portion 24, thereby covering the main body-side joint member 42 of the hinge unit 4 as well as the electrical wiring 5 extending from below the main body-side joint member 42 and connected to the control board 21. Finally, the inner cover 27 is attached to the upper case 23b of the main body case 23. Thus, the optical disc reproduction apparatus 1 is completed and assembled.

According to the thus structured optical disc reproduction apparatus 1 of the present embodiment, the hinge connecting portion 25 is connected to the main body-side joint member 42 of the hinge unit 4 in the state where the upper connecting member 60 (a part of the upper case 23b of the main body case 23) and the lower connecting member 70 (a part of the lower case 23a of the main body case 23) of the hinge connecting portion 25 are overlaid with each other to integrate the upper connecting member 60 and the lower connecting member 70 (i.e. where the overlaid portions of the upper case 23b and the lower case 23a of the main body case 23 are integrated with each other).

The overlay and integration of the upper connecting member 60 and the lower connection member 70 of the hinge connecting portion 25 with each other allows the hinge connecting portion 25 to have a large thickness. Further, the presence of the upper connecting member 60 between the main body-side joint member 42 of the hinge unit 4 and the lower connecting member 70 allows a load applied to the lower connecting member 70 to be dispersed over a wide area of the lower connecting member 70. These make it possible for the hinge connecting portion 25 to withstand a high load, thereby achieving a strong hinge connection structure. In addition, this structure does not require a separate reinforcing member such as a metal plate, so that the strong hinge connection structure can be achieved at a low cost.

Furthermore, the optical disc reproduction apparatus 1 makes it possible to house the main body-side joint member 42 of the hinge unit 4 into the hinge housing portion 24 from outside the main body case 23, and to connect the main body-side joint member 42 to the hinge connecting portion 25, in a state where the upper case 23b and the lower case 23a of the main body case 23 are connected to each other. Thus, when assembling the optical disc apparatus 1, the hinge unit 4 can be connected to the main body case 23 in the state where the upper case 23b and the lower case 23a of the main body case 23 are connected to each other, i.e. where the control board 21 is housed in the main body case 23, making it possible to achieve high assembling efficiency.

In addition, in the optical disc reproduction apparatus 1, the main body-side joint member 42 of the hinge unit 4 is housed in the hinge housing portion 24, which is recessed inside its periphery in the main body case 23, so that the optical disc reproduction apparatus 1 can be kept thin. Further, in a state where the main body-side joint member 42 of the hinge unit 4 is connected to the hinge connecting portion 25, a space is formed between the bottom base 61 of the upper connecting member 60 of the hinge connecting portion 25 and the main body-side joint member 42. This makes it possible to provide a space to allow the electrical wiring 5 to extend therethrough, and at the same time makes it possible to achieve a strong hinge connection structure.

It is to be noted that the present invention is not limited to the above embodiments, and various modifications are possible within the spirit and scope of the present invention. For example, the hinge mounting screws can be screwed from below the hinge connecting portion into the screw holes of the main body-side joint member of the hinge unit through the screw holes of the projections of the lower connecting member and the screw holes of the post portions of the upper connecting member of the hinge connecting portion. Further, it is possible to use a hinge mechanical unit which connects and allows the display-side joint member and the main body-side joint member to be pivotal relative to each other about a single axis. In addition, the present invention can be applied not only to an optical disc reproduction apparatus, but to any electronic apparatus which has a display unit attached to a main body unit via a hinge unit.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2010-090945 filed Apr. 9, 2010, the content of which is hereby incorporated by reference.

What is claimed is:

1. An electronic apparatus comprising a main body unit, a hinge unit and a display unit for displaying images which is mounted on the main body unit via the hinge unit, wherein the hinge unit comprises: a display-side joint member connected to the display unit; a main body-side joint member connected to the main body unit; and a hinge mechanical unit to pivotally connect the display-side joint member and the main body-side joint member to each other, wherein the main body unit comprises: a control board; a main body case for housing the control board; and a hinge connecting portion to be connected to the main body-side joint member of the hinge unit, wherein the main body case comprises a lower case corresponding to a lower part of the main body case, and an upper case corresponding to an upper part of the main body case and connected to the lower case, wherein the hinge connecting portion is formed of a part of the main body case, and comprises: an upper connecting member which is formed of a part of the upper case and to which the main body-side joint member of the hinge unit is attached; and a lower connecting member which is formed of a part of the lower case and which is overlaid on the upper connecting member, and wherein the main body-side joint member of the hinge unit is connected to both the upper connecting member and the lower connecting member with hinge mounting screws so as to be connected to the hinge connecting portion.

2. The electronic apparatus according to claim 1, wherein the main body unit further comprises a hinge housing portion formed therein for housing the main body-side joint member of the hinge unit, wherein the hinge housing portion is recessed inside its periphery in the main body case, and is open facing outward from the main body case so as to allow the main body-side joint member of the hinge unit to be housed into the hinge housing portion from outside the main body case, wherein the hinge connecting portion is placed in the hinge housing portion, and wherein the main body-side joint member of the hinge unit, while housed in the hinge housing portion, is connected to the hinge connecting portion.

3. The electronic apparatus according to claim 2, which further comprises an electrical wiring for electrically connecting the display unit to the main body unit, wherein the upper connecting member comprises: a bottom base positioned above the lower connecting member; and post portions projecting from the bottom base for supporting the main body-side joint member of the hinge unit, and wherein the electrical wiring extends inside the hinge unit and between the bottom base and front ends of the post portions, and is connected to the control board.

4. The electronic apparatus according to claim 3, wherein the main body unit further comprises an optical disc reading unit for reading recorded data from an optical disc, wherein the main body case houses the control board and the optical disc reading unit, and wherein the display unit displays images based on recorded data read by the optical disc reading unit from the optical disc.

5. The electronic apparatus according to claim 2, wherein the main body unit further comprises an optical disc reading unit for reading recorded data from an optical disc, wherein the main body case houses the control board and the optical disc reading unit, and wherein the display unit displays images based on recorded data read by the optical disc reading unit from the optical disc.

6. The electronic apparatus according to claim 1, which further comprises an electrical wiring for electrically connecting the display unit to the main body unit, wherein the upper connecting member comprises: a bottom base positioned above the lower connecting member; and post portions projecting from the bottom base for supporting the main body-side joint member of the hinge unit, and wherein the electrical wiring extends inside the hinge unit and between the bottom base and front ends of the post portions, and is connected to the control board.

7. The electronic apparatus according to claim 1, wherein the main body unit further comprises an optical disc reading unit for reading recorded data from an optical disc, wherein the main body case houses the control board and the optical disc reading unit, and wherein the display unit displays images based on recorded data read by the optical disc reading unit from the optical disc.

* * * * *